US010823422B2

(12) United States Patent
Johnson et al.

(10) Patent No.: US 10,823,422 B2
(45) Date of Patent: Nov. 3, 2020

(54) TANGENTIAL BULK SWIRL AIR IN A TRAPPED VORTEX COMBUSTOR FOR A GAS TURBINE ENGINE

(71) Applicant: General Electric Company, Schenectady, NY (US)

(72) Inventors: Arthur Wesley Johnson, Cincinnati, OH (US); Joseph Zelina, Waynesville, OH (US); Eric John Stevens, Mason, OH (US); Clayton Stuart Cooper, Loveland, OH (US); Beverly Stephenson Duncan, West Chester, OH (US); Juntao Zhang, Mason, OH (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 15/785,726

(22) Filed: Oct. 17, 2017

(65) Prior Publication Data
US 2019/0113235 A1    Apr. 18, 2019

(51) Int. Cl.
*F23R 3/58* (2006.01)
*F23R 3/14* (2006.01)
(Continued)

(52) U.S. Cl.
CPC .............. *F23R 3/58* (2013.01); *F01D 25/00* (2013.01); *F23R 3/04* (2013.01); *F23R 3/12* (2013.01);
(Continued)

(58) Field of Classification Search
CPC .... F23R 3/14; F23R 3/58; F23R 2900/00015; F23R 3/04; F23R 3/12; F23R 3/18
See application file for complete search history.

(56) References Cited

U.S. PATENT DOCUMENTS 3,722,216 A * 3/1973 Bahr ...................... F23R 3/14
60/804
5,619,855 A * 4/1997 Burrus ..................... F23R 3/02
60/262
(Continued)

FOREIGN PATENT DOCUMENTS

CN      101178223 A    5/2008
CN      102235670 A    11/2011
(Continued)

OTHER PUBLICATIONS

European Search Report Corresponding to Application No. 18189112 dated Feb. 27, 2019.
(Continued)

*Primary Examiner* — Carlos A Rivera
(74) *Attorney, Agent, or Firm* — Dority & Manning, P.A.

(57) ABSTRACT

A trapped vortex combustor for use in a gas turbine engine defines a radial direction, an axial direction, and a circumferential direction. The trapped vortex combustor includes an outer vortex chamber wall defining a forward end, and a dome attached to, or formed integrally with, the outer vortex chamber wall at the forward end of the outer vortex chamber wall. The dome and outer vortex chamber wall define at least in part a combustion chamber having an outer trapped vortex chamber. The dome includes an air chute defining an airflow direction. The radial direction and axial direction of the trapped vortex combustor define a reference plane extending through the air chute, the airflow direction of the air chute defining an angle greater than zero with the reference plane.

18 Claims, 7 Drawing Sheets

(51) Int. Cl.
  *F23R 3/12* (2006.01)
  *F23R 3/18* (2006.01)
  *F23R 3/04* (2006.01)
  *F23R 3/50* (2006.01)
  *F01D 25/00* (2006.01)

(52) U.S. Cl.
  CPC .................. *F23R 3/14* (2013.01); *F23R 3/18* (2013.01); *F23R 3/50* (2013.01); *F05D 2240/35* (2013.01); *F05D 2240/36* (2013.01); *F23R 2900/00015* (2013.01)

(56) References Cited

U.S. PATENT DOCUMENTS

| | | | | |
|---|---|---|---|---|
| 5,791,148 | A * | 8/1998 | Burrus | F01D 5/18 60/749 |
| 6,286,298 | B1 | 9/2001 | Burrus et al. | |
| 6,295,801 | B1 * | 10/2001 | Burrus | F23R 3/12 60/737 |
| 6,497,103 | B2 | 12/2002 | Johnson et al. | |
| 6,540,162 | B1 * | 4/2003 | Johnson | F23R 3/16 239/548 |
| 6,735,949 | B1 * | 5/2004 | Haynes | F23R 3/283 60/746 |
| 6,951,108 | B2 | 10/2005 | Burrus et al. | |
| 7,225,623 | B2 | 6/2007 | Koshoffer | |
| 7,779,866 | B2 | 8/2010 | Grammel, Jr. et al. | |
| 8,082,739 | B2 | 12/2011 | Chila et al. | |
| 8,297,057 | B2 | 10/2012 | Toon | |
| 8,322,142 | B2 | 12/2012 | Armstrong et al. | |
| 8,353,165 | B2 | 1/2013 | McMahan et al. | |
| 8,464,538 | B2 | 6/2013 | Evulet et al. | |
| 9,052,114 | B1 * | 6/2015 | Toqan | F23R 3/286 |
| 9,068,751 | B2 | 6/2015 | Snyder | |
| 10,513,984 | B2 | 12/2019 | Kim et al. | |
| 2002/0112482 | A1 * | 8/2002 | Johnson | F23R 3/16 60/776 |
| 2007/0012048 | A1 * | 1/2007 | Buret | F23C 5/32 60/804 |
| 2010/0212325 | A1 * | 8/2010 | Condevaux | F23R 3/06 60/772 |
| 2013/0086908 | A1 * | 4/2013 | Negulescu | F01D 9/041 60/726 |
| 2015/0323184 | A1 * | 11/2015 | Tangirala | F23R 3/50 60/746 |
| 2017/0051680 | A1 | 2/2017 | Becker, Jr. et al. | |
| 2017/0284674 | A1 | 10/2017 | Perveiler | |
| 2018/0347816 | A1 * | 12/2018 | Dziech | F23R 3/58 |
| 2018/0372319 | A1 | 12/2018 | Matsuyama et al. | |
| 2019/0113235 | A1 * | 4/2019 | Johnson | F23R 3/58 |

FOREIGN PATENT DOCUMENTS

| | | |
|---|---|---|
| CN | 102644935 A | 8/2012 |
| CN | 103277811 B | 10/2015 |
| CN | 106468181 A | 3/2017 |
| EP | 1010945 A2 | 6/2000 |
| EP | 2354663 A2 | 8/2011 |
| JP | 2000/193243 A | 7/2000 |
| JP | 2017/072359 A | 3/2017 |
| JP | 2017/116139 A | 6/2017 |
| JP | 2017/181021 A | 10/2017 |

OTHER PUBLICATIONS

Canadian Office Action Corresponding to Application No. 3013127 dated Jul. 4, 2019.
Machine Translated Japanese Search Report Corresponding to Application No. 2018152834 dated Dec. 2, 2019.
Machine Translated Japanese Office Action Corresponding to Application No. 2018152834 dated Dec. 9, 2019.
Combined Chinese Search Report and Office Action Corresponding to Application No. 2018109339565 dated Mar. 3, 2020.

* cited by examiner

TANGENTIAL BULK SWIRL AIR IN A TRAPPED VORTEX COMBUSTOR FOR A GAS TURBINE ENGINE

FEDERALLY SPONSORED RESEARCH

This invention was made with government support under contract number N00421-02-C-3202 with the United States Naval Air System Command, and under contract number FA8650-15-D-2501 with the United States Air Force. The government may have certain rights in the invention.

FIELD

The present disclosure relates generally to gas turbine engines and, more specifically, to a trapped vortex combustor assembly for use in gas turbine engines.

BACKGROUND

Aeronautical gas turbine engines are often used to generate thrust for an aircraft. Other gas turbine engines are used in various marine and industrial applications. Regardless, the gas turbine engines have a gas path that typically includes, in serial-flow order, an air intake, a compressor section, a combustor, a turbine section, and a gas outlet. Compressor and turbine sections include at least one row of circumferentially-spaced rotating blades coupled within a housing. The compressor section generally provides compressed air to the combustor, where the compressed air is mixed with fuel and combusted to generate combustion gases. The combustion gases flow through the turbine section to power the turbine section. The turbine section may, in turn, power the compressor section and optionally a propulsor, such as a fan or propeller.

Advanced gas turbine engine technology requirements are driving the combustors therein to be shorter in length, have higher performance levels over wider operating ranges, and produce lower exhaust pollutant emission levels. Trapped vortex combustors have been developed in an attempt to achieve these goals. As used herein, the term "trapped vortex combustor" generally refers to a combustor having one or more sections (e.g., inner and/or outer trapped vortex chambers) upstream of a main combustion chamber configured to at least partially pre-mix and pre-vaporize fuel in a swirling vortex of pressurized air.

The trapped vortex chamber may be positioned radially outward of the main combustion chamber, allowing for a reduction in overall length of the combustion chamber. However, further developments for reducing the overall length of the combustion chamber would be useful.

BRIEF DESCRIPTION

Aspects and advantages of the invention will be set forth in part in the following description, or may be obvious from the description, or may be learned through practice of the invention.

In one embodiment of the present disclosure, a trapped vortex combustor for use in a gas turbine engine is provided. The trapped vortex combustor defines a radial direction, an axial direction, and a circumferential direction. The trapped vortex combustor includes an outer vortex chamber wall defining a forward end, and a dome attached to, or formed integrally with, the outer vortex chamber wall at the forward end of the outer vortex chamber wall. The dome and outer vortex chamber wall define at least in part a combustion chamber having an outer trapped vortex chamber. The dome includes an air chute defining an airflow direction. The radial direction and axial direction of the trapped vortex combustor define a reference plane extending through the air chute, the airflow direction of the air chute defining an angle greater than zero with the reference plane.

In certain exemplary embodiments the angle defined by the airflow direction of the main air chute with the reference plane is greater than about five degrees and less than about fifty degrees.

In certain exemplary embodiments the air chute is a main air chute of the dome.

For example, in certain exemplary embodiments the dome further includes a plurality of main air chutes spaced along the circumferential direction of the trapped vortex combustor, wherein the combustion chamber is configured to receive a total amount of airflow during operation, and wherein at least about fifteen percent of the total amount of airflow is provided through the plurality of main air chutes.

For example, in certain exemplary embodiments between about twenty percent and about eighty-five percent of the total amount of airflow is provided through the plurality of main air chutes.

In certain exemplary embodiments the main air chute includes at least one vane positioned therein.

In certain exemplary embodiments the main air chute includes at least one body splitter positioned therein.

In certain exemplary embodiments the air chute defines a height and a width, wherein the height is greater than the width.

In certain exemplary embodiments the air chute is a seal chute of the dome

In certain exemplary embodiments the air chute is a main air chute of the dome, wherein the dome further includes a seal chute, wherein the seal chute defines an airflow direction in the reference plane, wherein the dome defines a reference line extending through the seal chute in the reference plane, and wherein the airflow direction defines an angle with the reference line of the dome less than ninety degrees and greater than about forty-five degrees.

For example, in certain exemplary embodiments, the trapped vortex combustor further includes an outer transition wall attached to or formed integrally with the outer vortex chamber wall; and an outer combustion chamber liner attached to or formed integrally with the outer transition wall, wherein the outer transition wall and the outer combustion chamber liner together form a corner, and wherein the airflow direction of the seal chute intersects the corner.

In certain exemplary embodiments the trapped vortex combustor further includes an outer transition wall attached to or formed integrally with the outer vortex chamber wall, wherein at least one of the dome, the outer vortex chamber wall, or the outer transition wall defines a fuel nozzle opening. With such an embodiment, the trapped vortex combustor may further include a fuel nozzle positioned in or extending through the fuel nozzle opening, the fuel nozzle defining a mean fuel spray direction, and wherein the mean fuel spray direction defines an angle with the reference plane greater than zero degrees and less than about forty-five degrees.

For example, in certain exemplary embodiments the angle defined by the mean fuel spray direction and the reference plane is greater than about ten degrees and less than about forty degrees In certain exemplary embodiments the air chute is located inwardly of the outer vortex chamber along the radial direction.

For example, in certain exemplary embodiments, the trapped vortex combustor may further include an inner vortex chamber wall including a forward end and defining in part the combustion chamber, wherein the dome is attached to or formed integrally with the inner vortex chamber wall at the forward end of the inner vortex chamber wall, and wherein the combustion chamber further includes an inner vortex chamber.

For example, in certain exemplary embodiments the air chute is a main air chute, and wherein the main air chute is positioned outward of the inner vortex chamber along the radial direction.

In an exemplary aspect of the present disclosure, a method for operating a trapped vortex combustor of a gas turbine engine is provided. The trapped vortex combustor includes an outer vortex chamber wall and a dome attached to, or formed integrally with, the outer vortex chamber wall. The dome and the outer vortex chamber wall define at least in part a combustion chamber having an outer trapped vortex chamber. The dome further includes a main air chute. The method includes providing a total amount of airflow to the combustion chamber, wherein providing the total amount of airflow to the combustion chamber includes providing a main airflow to the combustion chamber through the main air chute along an airflow direction, the airflow direction defining an angle with a reference plane greater than zero degrees and less than about forty-five degrees, the reference plane defined by a radial direction and an axial direction of the gas turbine engine.

In certain exemplary aspects the dome further includes a plurality of main air chutes spaced along a circumferential direction of the gas turbine engine, and wherein providing the main airflow to the combustion chamber through the main air chute includes providing the main airflow to the combustion chamber through the plurality of main air chutes spaced along the circumferential direction, and wherein the main airflow is at least about fifteen percent of the total amount of airflow provided to the combustion chamber.

For example, in certain exemplary aspects the main airflow is between about twenty percent and about eighty-five percent of the total amount of airflow provided to the combustion chamber.

In another exemplary embodiment of the present disclosure, a gas turbine engine is provided. The gas turbine engine defines a radial direction, an axial direction, and a circumferential direction. The gas turbine engine includes a compressor section; a turbine section; and a combustion section located downstream of the compressor section and upstream of the turbine section. The compressor section includes a trapped vortex combustor. The trapped vortex combustor includes an outer vortex chamber wall defining a forward end, and a dome attached to, or formed integrally with, the outer vortex chamber wall at the forward end of the outer vortex chamber wall. The dome and outer vortex chamber wall define at least in part a combustion chamber having an outer trapped vortex chamber, the dome including an air chute defining an airflow direction, the radial direction and axial direction defining a reference plane extending through the air chute, the airflow direction of the air chute defining an angle greater than zero with the reference plane.

In certain exemplary embodiments the angle defined by the airflow direction of the air chute with the reference plane is greater than about ten degrees and less than about forty-five degrees.

In certain exemplary embodiments the dome further includes a plurality of air chutes spaced along the circumferential direction of the trapped vortex combustor, wherein the combustion chamber is configured to receive a total amount of airflow during operation, and wherein at least about fifteen percent of the total amount of airflow is provided through the plurality of air chutes.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
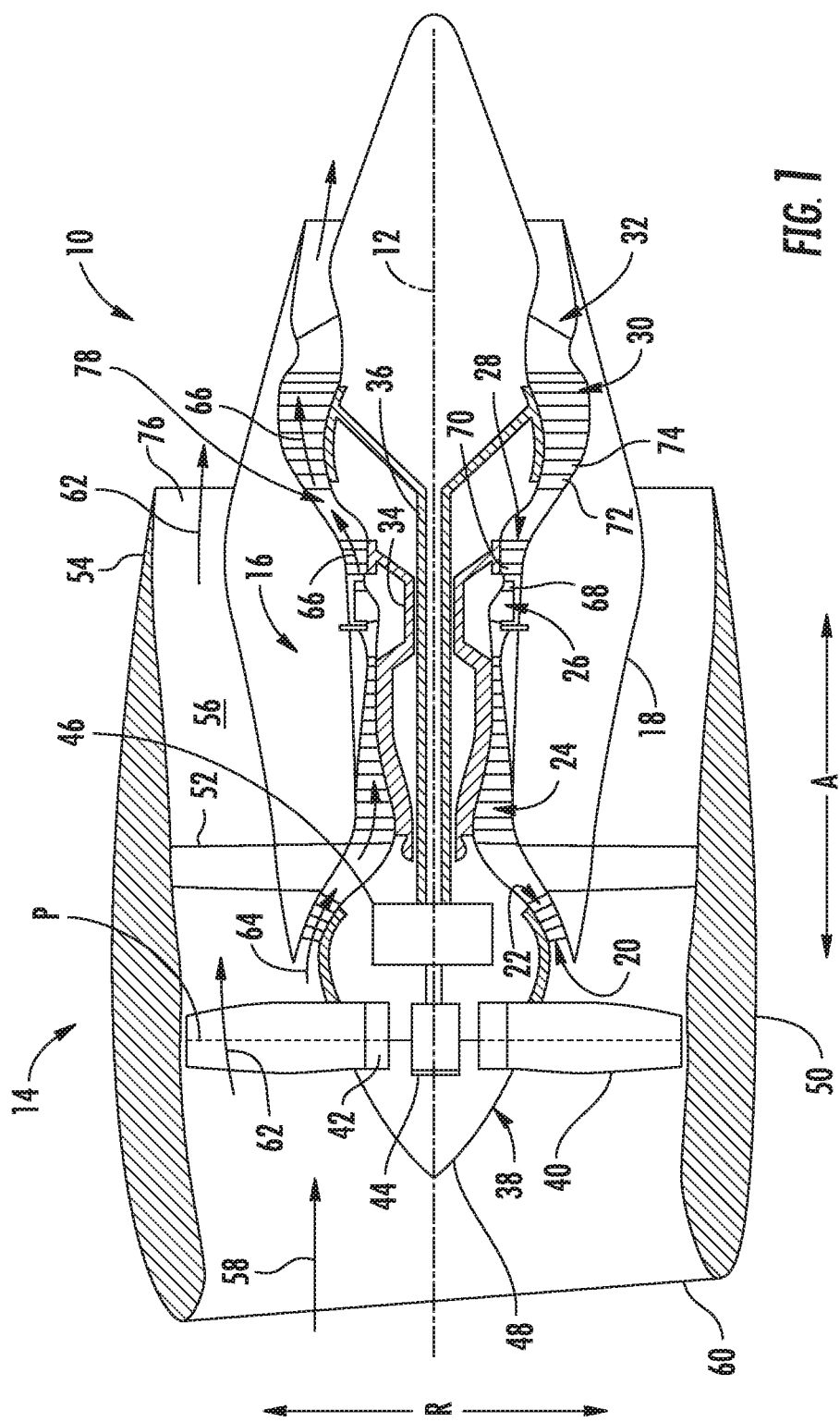
FIG. 1 is a schematic, cross-sectional view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the Figures (Figs.), FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66. Notably, as will be described in greater detail, below, the combustion section 26 includes a trapped vortex combustor for mixing the compressed air with fuel and generating combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may instead be configured as, e.g., a direct-drive turbofan engine, a fixed-pitch turbofan engine, etc. Additionally, or alternatively, the turbofan engine 10 may be configured as a turboprop engine, a turbojet engine, a turboshaft engine, a ramjet engine, an auxiliary power unit engine, etc. Additionally, or alternatively, still, in other embodiments the turbofan engine 10 of FIG. 1 may instead be configured as an aeroderivative gas turbine engine, e.g., for nautical uses, or as an industrial gas turbine engine, e.g., for power generation.

Figure 2:
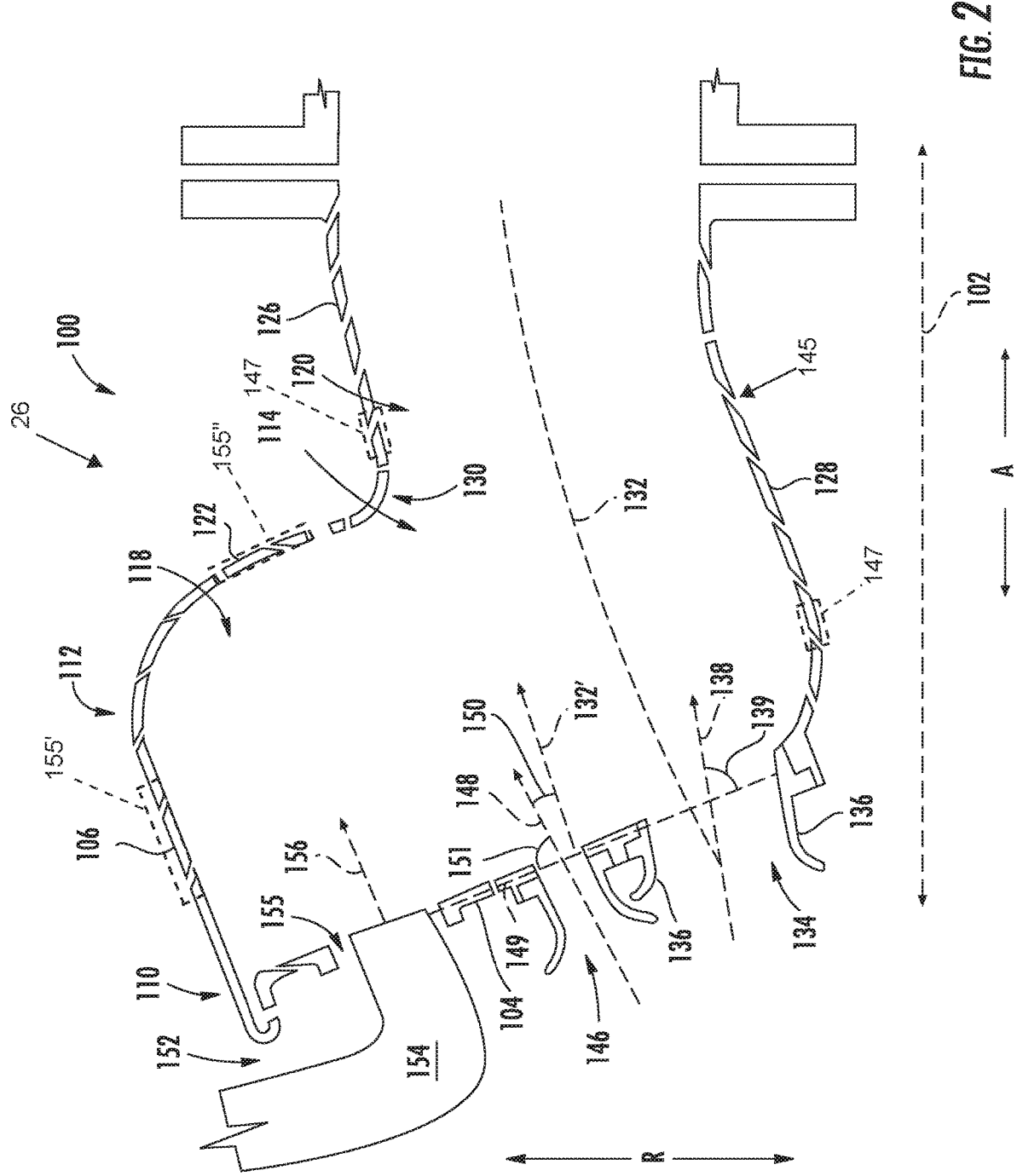
FIG. 2 is a side, schematic, cross-sectional view of a combustor assembly in accordance with an exemplary embodiment of the present disclosure.

Referring now to FIG. 2, a close-up, cross-sectional view of a combustion section 26 of a gas turbine engine in accordance with an exemplary embodiment of the present disclosure is provided. The combustion section 26 depicted in FIG. 2 may, in certain exemplary embodiments, be the exemplary combustion section 26 described above with reference to FIG. 1. However, in other exemplary embodiments, the combustion section 26 of FIG. 2 may be incorporated into any other suitable gas turbine engine, such as any suitable turboprop engine, turbojet engine, turboshaft engine, ramjet engine, auxiliary power unit engine, aeroderivative gas turbine engine, industrial gas turbine engine, etc.

Figure 3:
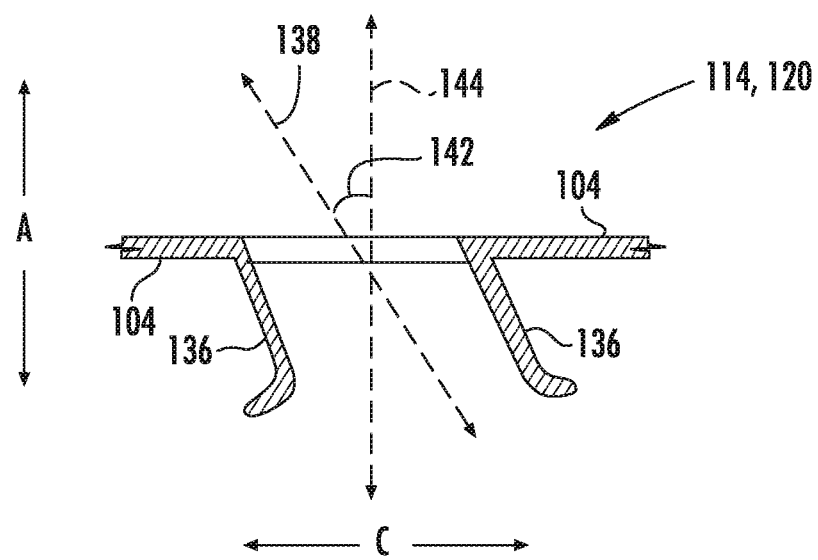
FIG. 3 is a top, cross-sectional, schematic view of a main airflow chute in accordance with an exemplary embodiment of the present disclosure as may be incorporated into the combustor assembly of FIG. 2.

As will be appreciated, the combustion section 26 generally includes a combustor 100, with the combustor 100 defining an axial direction A (and an axial centerline 102), a radial direction R, and a circumferential direction C (i.e., a direction extending about the axial direction A; see FIG. 3). Notably, in certain exemplary embodiments, the axial direction A, radial direction R, and circumferential direction C defined by the combustor 100 may align with the axial direction A, radial direction R, and circumferential direction C defined by the gas turbine engine within which it is installed (see FIG. 1), and further, the axial centerline 102 may align with the longitudinal centerline 12 of the gas turbine engine within which it is installed (see FIG. 1).

The exemplary combustor 100 depicted in FIG. 2 is generally configured as, and referred to herein as, a trapped vortex combustor 100. The trapped vortex combustor 100 generally includes a dome 104 and an outer vortex chamber wall 106. The outer vortex chamber wall 106 extends between and defines a forward end 110 and an aft end 112, and the dome 104 is attached to, or formed integrally with, the outer vortex chamber wall 106 at the forward end 110 of the outer vortex chamber wall 106. The dome 104 and the outer vortex chamber wall 106 together at least in part define a combustion chamber 114, with the combustion chamber 114 including an outer trapped vortex chamber 118 and a main flow chamber 120. As is depicted, the outer trapped vortex chamber 118 is positioned radially outward of the main flow chamber 120 along the radial direction R.

The trapped vortex combustor 100 further includes an outer transition wall 122 (which, as will be appreciated, forms an aft wall of the outer trapped vortex chamber 118, and accordingly may additionally, or alternatively, be referred to as a "vortex chamber aft wall"). The outer transition wall 122 is attached to, or formed integrally with, the outer vortex chamber wall 106 at the aft end 112 of the outer vortex chamber wall 106, and extends generally inwardly along the radial direction R to further define the outer trapped vortex chamber 118. Further, the trapped vortex combustor 100 includes an outer combustion chamber liner 126 and an inner combustion chamber liner 128. The outer combustion chamber liner 126 is attached to, or formed integrally with, the outer transition wall 122 and extends generally aft therefrom. As will be discussed in greater detail below, the outer transition wall 122 and outer combustion chamber liner 126 together form a corner 130. Additionally, for the embodiment depicted, the inner combustion chamber liner 128 is attached to, or formed integrally with, the dome 104 and extends generally aft therefrom. For the embodiment depicted, the main flow chamber 120 is generally defined between the outer combustion chamber liner 126 and the inner combustion chamber liner 128. It will be appreciated that as used herein, the term "corner," such as corner 130, refers to a region where the two walls forming such corner meet. More specifically, when the corner is a rounded corner, such as corner 130, the corner includes the entire portion of the wall that begins to curve to form the corner.

Moreover, as will be appreciated the inner combustion chamber liner 128 and outer combustion chamber liner 126 define at least in part a combustion chamber centerline 132. The combustion chamber centerline 132 extends along a radial midpoint of the main flow chamber 120.

As is also depicted in FIG. 2, for the embodiment shown, the dome 104 additionally includes a main air chute 134. The main air chute 134 is configured to provide a substantial amount of airflow to the combustion chamber 114 during operation of the trapped vortex combustor 100. Additionally, the main air chute 134 is configured to provide such airflow at a swirl angle 142 (defined below) to introduce a bulk swirl to the airflow through the combustion chamber 114. More specifically, referring now also to FIG. 3, providing a cross-sectional view of the main air chute 134 along the radial direction R, it will be appreciated that the main air chute 134 of the dome 104 includes a chute wall 136 and defines an airflow direction 138. The airflow direction 138 of the main air chute 134, for the embodiment depicted, extends along a centerline of the chute wall 136 and depicts a direction in which airflow entering the combustion chamber 114 through the main air chute 134 enters the combustion chamber 114.

As stated, the main air chute 134 introduces the airflow at a swirl angle 142. More specifically, the trapped vortex combustor 100 defines a reference plane 144, or more specifically, the radial direction R and the axial direction A of the trapped vortex combustor 100 define the reference plane 144. The reference plane 144 extends through the exemplary main air chute 134 depicted. As will be appreciated, the view of FIG. 2, is a view of the reference plane 144. The airflow direction 138 of the main air chute 134 for the embodiment depicted defines an angle, i.e., the swirl angle 142, greater than zero (0) with the reference plane 144. More specifically, for the embodiment depicted, the swirl angle 142 defined by the airflow direction 138 of the main air chute 134 and the reference plane 144 is greater than about five degrees and less than or equal to about fifty degrees, such as greater than about ten degrees and less than or equal to about forty-five degrees, such as greater than about fifteen degrees, such as greater than about twenty degrees, such as greater than about twenty-five degrees. As will be appreciated, introducing the airflow through the main air chute 134 at this swirl angle 142 introduces a bulk swirl to the airflow through the main flow chamber 120 of the combustion chamber 114, which has the benefit of increasing an overall travel length of such airflow for a given axial length of the trapped vortex combustor 100, allowing for a shorter overall axial length of the trapped vortex combustor 100. For example, the airflow through the main flow chamber 120 of the combustion chamber 114 may need to travel minimum distance in order to provide such airflow a sufficient amount of residence time to burn out. Introducing the bulk swirl to the main flow chamber 120 may allow for the airflow through the main flow chamber 120 to travel a desired distance with an overall shorter combustor along the axial direction A.

Figure 4:
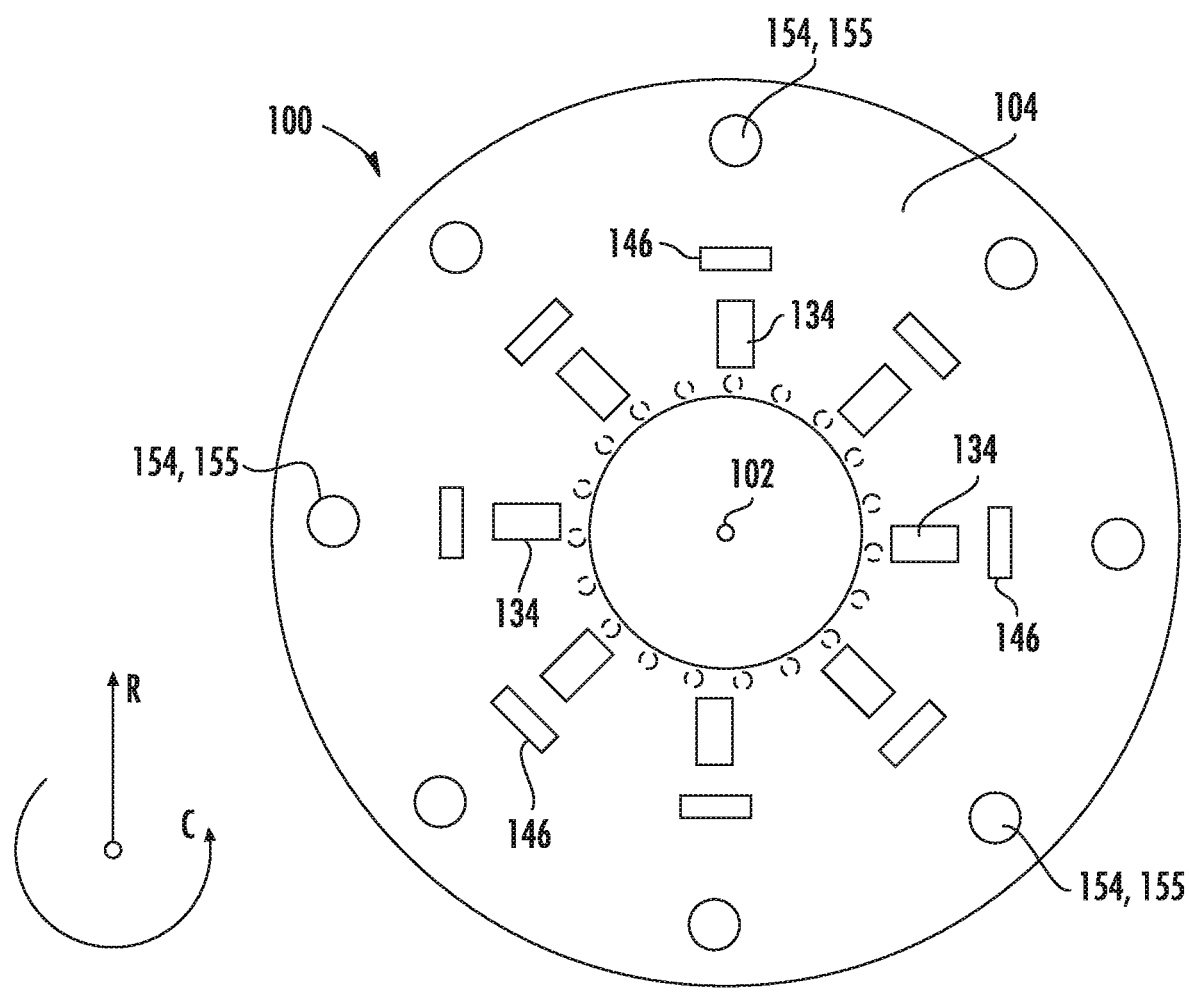
FIG. 4 is a schematic, forward end view of the exemplary combustor assembly of FIG. 2.

Referring now also to FIG. 4, providing a view from a location aft of a forward end of the trapped vortex combustor 100 along the axial direction A, it will be appreciated that the trapped vortex combustor 100 further includes a plurality of main air chutes 134 spaced along the circumferential direction C of the trapped vortex combustor 100. It will be appreciated, that although the embodiment depicted shows eight main air chutes 134 spaced along the circumferential direction C, in other embodiments, the trapped vortex combustor 100 may include any other suitable number of main air chutes 134, such as at least four, at least ten, at least twenty, or more. In other embodiments, the trapped vortex combustor 100 may include up to fifty or one hundred of main air chutes 134.

It will further be appreciated that during operation, the combustion chamber 114 is configured to receive a total amount of airflow. The plurality of main air chutes 134 are configured to provide a relatively large portion of this total amount of airflow during operation. For example, in certain embodiments, the plurality of main air chutes 134 may be configured to provide at least about fifteen percent of the total amount of airflow to the combustion chamber 114. For example, in certain exemplary embodiments, between about twenty percent and about eighty-five percent of the total amount of airflow is provided through the plurality main air chutes 134, such as between about twenty-five percent and seventy-five percent, such as between about thirty percent and sixty percent of the total amount of airflow.

Notably, the combustor 100 may further define a plurality of dilution holes 147 (depicted in phantom) to provide additional airflow to the combustion chamber 114. Although depicted schematically as being defined at a radially inner end of the dome 104, in other embodiments, such dilution holes 147 may additionally, or alternatively, be defined in the inner combustion chamber liner 128 (e.g., proximate the dome 104; shown in phantom in FIG. 2), in the outer combustion chamber line 126 (e.g., proximate the corner 130; shown in phantom in FIG. 2), or in any other wall at any other suitable location.

It should be appreciated, that for the exemplary embodiments depicted, the plurality of main air chutes 134 may be "configured to provide" the percentage of the total airflow by sizing the main air chutes 134 appropriately relative to any other holes or openings to the combustion chamber 114 (e.g., including cooling air holes 145, dilution air holes 147 (depicted in phantom), etc.).

Referring again to FIG. 2, it will be appreciated that for the embodiment depicted, the dome 104 further includes a seal chute 146. Similar to the main air chute 134, the seal chute 146 defines an airflow direction 148. However, for the embodiment depicted, the airflow direction 148 defined by the seal chute 146 is in a direction extending within the reference plane 144 (i.e., not defining a swirl angle, i.e., defining an angle approximately equal to zero with the reference plane 144). Instead, however, for the embodiment depicted, the seal chute 146 is positioned radially inward of the outer vortex chamber 118 and oriented radially outwardly. For example, the airflow direction 148 defined by the seal chute 146 defines an angle 150 with the chamber centerline 132 (depicted with a reference line 132' extending parallel to centerline 132 for clarity) of the combustion chamber 114 greater than zero (0) degrees and less than about forty-five degrees. For example, in at least certain embodiments, angle 150 defined by the airflow direction 148 of the seal chute 146 with the chamber centerline 132 of the combustion chamber 114 may be greater than about five degrees, such as greater than about ten degrees, such as greater than about fifteen degrees, such as greater than about twenty degrees, such as greater than about thirty degrees.

Further, it will be appreciated that the exemplary dome 104 defines a reference line 149 extending through the seal chute 146 in the reference plane 144 (i.e., the plane depicted in FIG. 2, see also FIG. 3). The airflow direction 148 of the seal chute 146 defines an angle 151 with the reference line 149 less than ninety degrees and greater than about forty-five degrees, such as less than about eighty-five degrees, such as less than about eighty degrees, such as less than about seventy-five degrees.

More practically speaking, as stated earlier, the outer transition wall 122 and the outer combustion chamber liner together form the corner 130. The angle 151 defined between the airflow direction 148 of the seal chute 146 and the reference line 149, as well as the angle 150 defined between the airflow direction 148 of the seal chute 146 and the chamber centerline 132, is such that the airflow direction 148 of the seal chute 146 intersects the corner 130. In such a manner, the seal chute 146 may act to "seal off" an outer portion of the combustion chamber 114 (i.e., the trapped vortex chamber 118) during operation of the trapped vortex combustor 100, allowing for more complete combustion within the combustion chamber 114.

Referring again briefly to FIG. 4, it will be appreciated that the trapped vortex combustor 100 further includes a plurality of seal chutes 146 spaced along the circumferential direction C of the trapped vortex combustor 100. As with the main air chutes 134, although the embodiment shown includes eight seal chutes 146, in other embodiments, the trapped vortex combustion 100 may have any other suitable number of seal chutes 146. The plurality of seal chutes 146 may each define an airflow direction 148, with the airflow direction 148 of each of the plurality of seal chutes 146 defining an angle 150 with the chamber centerline 132 and/or an angle 151 with the reference line 149 resulting in the airflow direction 148 intersecting with the corner 130 formed by the outer transition wall 122 and the outer combustion chamber liner 126. Further, each of the plurality of seal chutes 146 may together provide an amount of airflow less than the amount airflow provided by the plurality of main air chutes 134. For example, during operation of the trapped vortex combustor 100, the plurality of seal chutes 146 may provide at least about ten percent of the total amount of airflow to the combustion chamber 114. For example, in certain exemplary embodiments, between about fifteen percent and about fifty percent of the total amount of airflow may be provided through the plurality seal chutes 146, such as between about twenty percent and forty percent of the total amount of airflow may be provided through the plurality seal chutes 146.

It will be appreciated, however, that in other embodiments the airflow direction 148 of the seal chutes 146 may also define a swirl angle with the reference plane 144 in the same manner as one or more of the exemplary main air chutes 134 described above (e.g., the same magnitude). For example, in certain exemplary embodiments, the seal chutes 146 may each be configured in substantially the same manner as the main air chutes 134 depicted in FIG. 3 (at least with respect to their orientation relative to the reference plane 144). With such an exemplary embodiment (i.e., when the seal chutes 146 introduce airflow at a swirl angle greater than zero), the trapped vortex chamber 100 may introduce airflow through the main air chutes 134 at the swirl angle 142 described above, at an angle 142 equal to zero, or alternatively may not include the main air chutes 134.

Referring now back particularly to FIG. 2, it will be appreciated that in addition to introducing the main airflow at the swirl angle 142 to introduce a bulk swirl to the airflow through the combustion chamber 114, the main airflow chutes 134 may further be configured to direct the airflow in a radially inward direction relative to, e.g., the combustion chamber centerline 132. For example, the airflow direction 138 of the main airflow chute 134 may define an angle 139 less than ninety degrees and greater than about forty-five degrees with the reference line 149 of the dome 104. For example, the angle 139 may be between eighty-five degrees and fifty degrees, such as between seventy-five degrees and sixty degrees.

Furthermore, referring still to FIG. 2, the trapped vortex combustor 100 also includes a fuel nozzle assembly 152. The fuel nozzle assembly 152 generally includes a plurality of fuel nozzles 154 configured to provide fuel to the outer trapped vortex chamber 118 during operation. Although the exemplary embodiment depicted includes eight fuel nozzles 154, in other embodiments, the trapped vortex combustor 100 may have any other suitable number of fuel nozzles 154, such as between four and about twenty-five, or more, or less. Additionally, the dome 104 generally defines a plurality of fuel nozzle openings 155 configured to receive the respective plurality of fuel nozzles 154, with each fuel nozzle 154 positioned at least partially in, or extending through, a respective fuel nozzle opening 155 of the dome 104. As will be appreciated, during operation, each fuel nozzle 154 is configured to spray fuel into the outer trapped vortex chamber 118. More specifically, each fuel nozzle 154 defines a mean fuel spray direction 156 (i.e., an average direction in which the fuel nozzle 154 sprays the fuel during operation).

Figure 5:
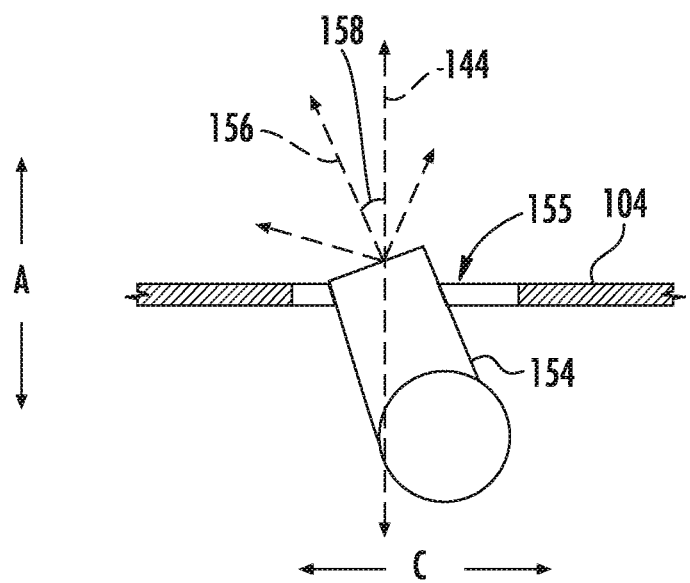
FIG. 5 is a top, cross-sectional, schematic view of a fuel nozzle in accordance with an exemplary embodiment of the present disclosure as may be incorporated into the combustor assembly of FIG. 2.

Referring now briefly to FIG. 5, providing a cross-sectional view of a fuel nozzle 154 along the radial direction R, it will be appreciated that the mean fuel spray direction 156 defined by the fuel nozzle 154 also defines a swirl angle 158. More specifically, the mean fuel spray direction 156 defined by the fuel nozzle 154 defines an angle, i.e., the swirl angle 158, with the reference plane 144 greater than zero (0) degrees and less than about forty-five degrees. For example, in the embodiment shown, the swirl angle 158 defined by the mean fuel spray direction 156 and the reference plane 144 is greater than about ten degrees and less than about forty-five degrees, such as greater than about fifteen degrees, such as greater than about twenty degrees, such as greater than about thirty degrees. It will be appreciated that in at least certain embodiments, each fuel nozzle 154 of the fuel nozzle assembly 152 may define a substantially similar swirl angle 158 (i.e., with a respective reference plane extending therethrough). Orienting the nozzles 154 of the fuel nozzle assembly 152 in such a manner may assist with the generation of bulk swirl within the combustion chamber 114 of the trapped vortex combustor 100.

It will be appreciated, however, that in other exemplary embodiments, the fuel nozzle 154 may instead have any other configuration. For example, in other embodiments, the fuel nozzle 154 may define a mean fuel spray direction 156 that defines an angle 158 with the reference plane 144 equal to zero degrees. It will further be appreciated that although the fuel nozzle assembly 152 is depicted in, e.g., FIGS. 2 and 5 including a plurality of fuel nozzles 154 extending through openings 155 in the dome 104, in other embodiments the fuel nozzle assembly 152 may additionally, or alternatively, include fuel nozzles extending through, or otherwise configured to inject fuel through, e.g., one or more openings defined by the outer vortex chamber wall 106 (e.g., openings 155', depicted in phantom) and/or the outer transition wall 122 (e.g., openings 155", also depicted in phantom). With each of these embodiments, the mean fuel spray direction 156 may define any of the above angles 158 with the reference plane 144 to, e.g., introduce such fuel at a swirl angle, or at a straight-forward angle.

Figure 6:
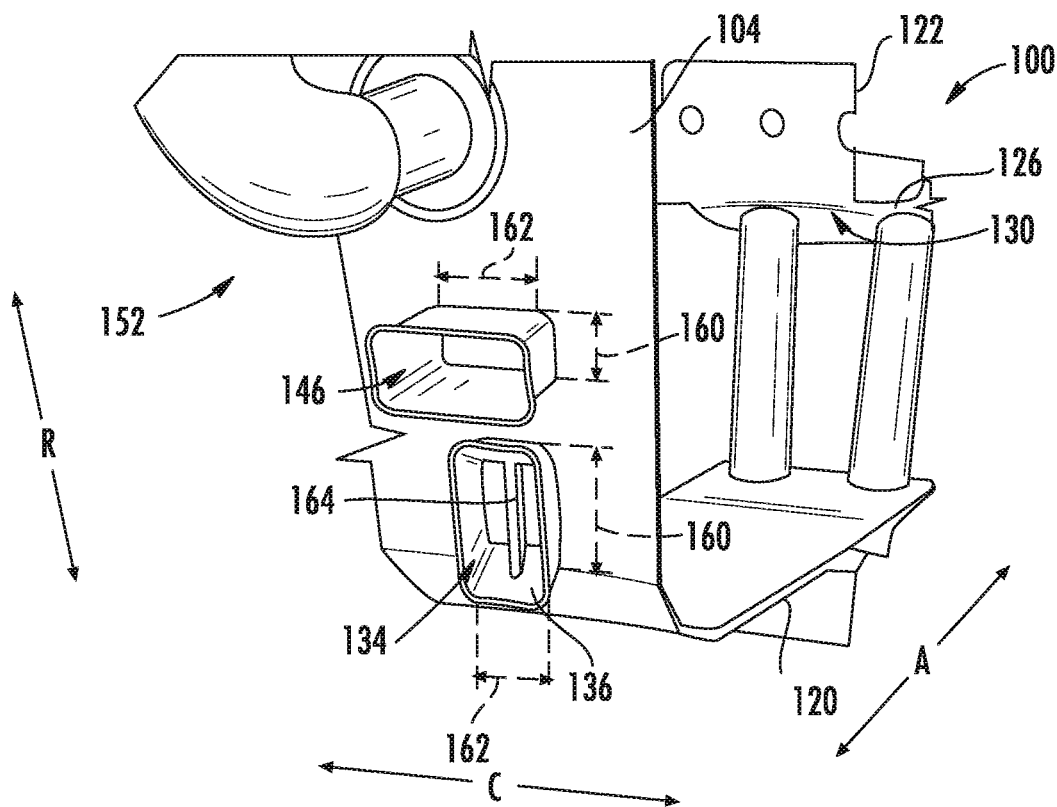
FIG. 6 is a perspective view of a forward end of a section of the exemplary combustor assembly of FIG. 2.

Referring now to FIG. 6, a perspective view is provided of a forward end of a section of the exemplary trapped vortex combustor 100 described above. As is depicted, for the embodiment of FIG. 6, it will be appreciated that the seal chute 146 and the main air chute 134 are each located inwardly of the outer vortex chamber 118 of the combustion chamber 114 along the radial direction R. Further, the main air chute 134 is located inwardly of the seal chute 146 along the radial direction R. Further, for the embodiment depicted, the main air chute 134 defines a height 160 and a width 162. The width 162 is defined in a direction generally along the circumferential direction C of the trapped vortex combustor 100. For the embodiment depicted, the height 160 is greater than the width 162, such as at least about 1.5 times greater than the width 162. Similarly, for the embodiment depicted, the seal chute 146 defines a height 161 and a width 163, the width 163 again being defined in a direction generally along the circumferential direction C of the trapped vortex combustor 100. By contrast, however, for the embodiment depicted, the width 163 of the seal chute 146 is greater than the height 161, such as at least about two times greater than the height 160.

Further, for the embodiment depicted, the seal chute 146 is a completely open chute, whereas the main air chute 134 includes an airflow member 164 extending therein. More specifically, for the embodiment of FIG. 6, the airflow member 164 is configured as an airfoil extending along the entire height 160 of the main air chute 134 at a location halfway across the width 162 of the main air chute 134.

It will be appreciated, however, that in other exemplary embodiments, the seal chute 146 and/or the main air chute 134 may have any other suitable configuration. For example, in other embodiments, the seal chute 146 and/or the main air chute 134 may instead have any other suitable height 160, 161 to width 162, 163 ratio, airflow member 164 configuration, etc.

Figure 7:
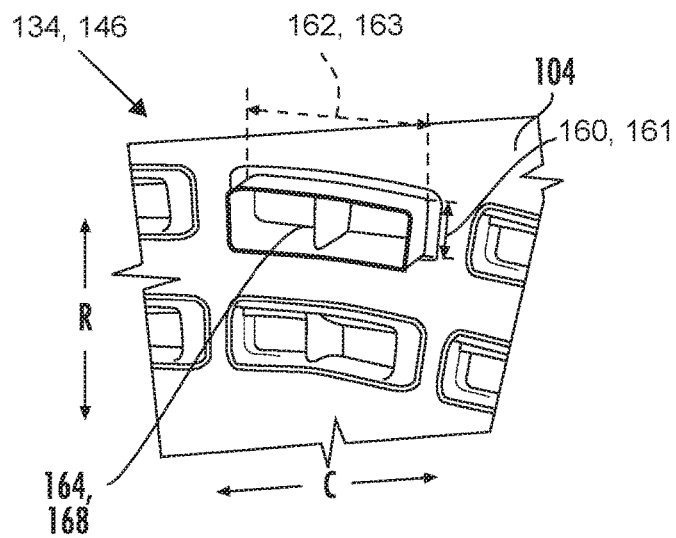
FIG. 7 is a perspective view of a chute in accordance with another exemplary embodiment of the present disclosure.
Figure 8:
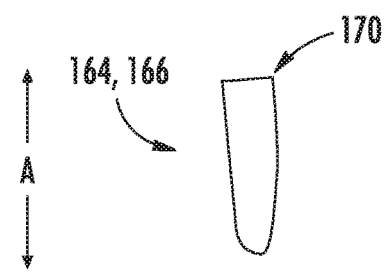
FIG. 8 is a cross-sectional view of an airflow member within a chute in accordance with an exemplary embodiment of the present disclosure.

Further, referring now briefly to FIGS. 7 through 11, various other configurations are depicted of a chute which may be one or more of a main air chute 134 and/or a seal chute 146 (accordingly, the chutes are labeled "134, 146," the heights are labeled "160, 161," and the widths are labeled "162, 163"). For example, FIG. 7 depicts a chute having a greater width 162, 163 than height 160, 161 and including an airflow member 164 extending along the height 160, 161. However, for the embodiment of FIG. 7, the airflow member 164 is not an airfoil, and instead is configured as a body splitter 168. More specifically, referring also to FIG. 8, providing a cross-sectional view of the exemplary body splitter 168 of FIG. 7, it will be appreciated that a downstream end 170 of the body splitter 168 is relatively blunt to promote mixing of an airflow over the downstream end 170 of the body splitter 168. As is also depicted in FIG. 7, the chute includes a stacked configuration, wherein multiple chutes may be arranged along the radial direction R, as well as along the circumferential direction C.

It will be appreciated, however, that in certain exemplary embodiments, the inner chutes (i.e., inner along the radial direction R) may not be aligned along the radial direction R with the outer chutes (i.e., outer along the radial direction R), as is the case for the embodiment of FIG. 7. For example, in certain exemplary embodiments, the inner chutes may be offset from the outer chutes, such that each inner chute is positioned between adjacent outer chutes along the circumferential direction C. Notably, the inner and outer chutes in FIG. 7 may each be main air chutes 134, or alternatively, the inner chutes may be main air chutes 134 and the outer chutes may be seal chutes 146.

Figure 9:
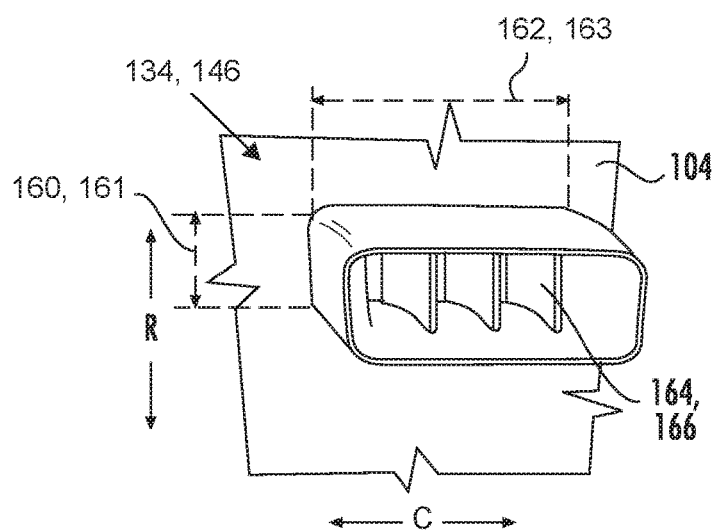
FIG. 9 is a perspective view of a chute in accordance with yet another exemplary embodiment of the present disclosure.
Figure 10:
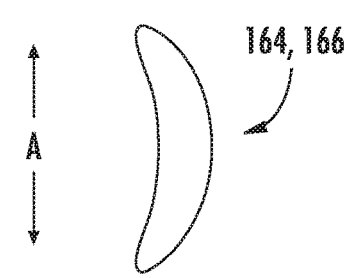
FIG. 10 is a cross-sectional view of an airflow member within a chute in accordance with another exemplary embodiment of the present disclosure.

Further, referring now to FIG. 9, a chute in accordance with another exemplary embodiment of the present disclosure is depicted. The exemplary chute of FIG. 9 also defines a greater width 162, 163 than height 160, 161, and includes a plurality of airflow members 164 extending along the height 160, 161. Referring briefly also to FIG. 10, providing a cross-sectional view of one of the airflow members 164, it will be appreciated that for the embodiment shown, the plurality of airflow members 164 are each configured in an airfoil configuration. Moreover, referring back to FIG. 9, it will be appreciated that the chute does not extend in a straight direction, and instead defines curve along its length (i.e., generally along the axial direction A). With such a configuration, the airflow direction of the chute (such as the airflow direction 148 when the chute is configured as a seal chute 146, or the airflow direction 138 when the chute is configured as a main air chute 134) may refer to an effective direction in which airflow exits the chute.

Figure 11:
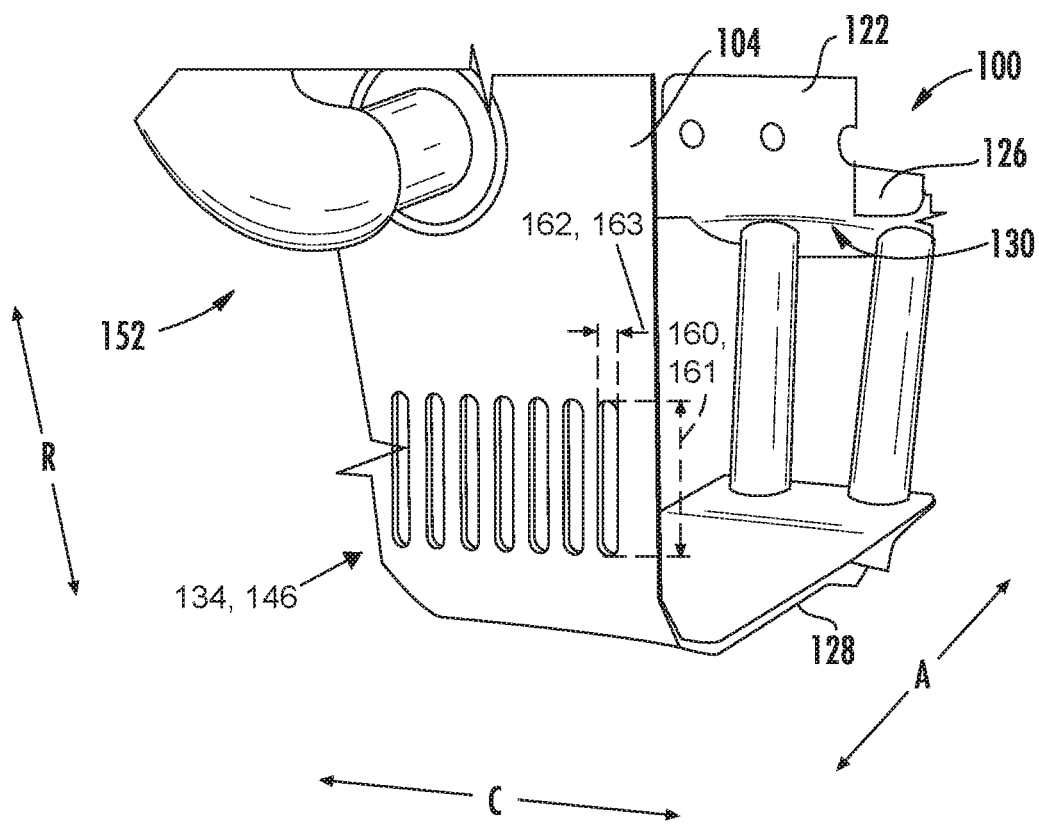
FIG. 11 is a perspective view of a forward end of a combustor assembly including a plurality of airflow chutes in accordance with another exemplary embodiment of the present disclosure.

Further, still, referring now to FIG. 11, it will be appreciated that in other embodiments, the chute may define a much greater height 160, 161 and width 162, 163. For example, for the embodiment of FIG. 11, the chute is configured as a long skinny aspect ratio chute having a height 160, 161 at least about four times greater than the width 162, 163, and up to about ten times greater width 162, 163. It will be appreciated that the exemplary chutes of FIG. 11 are depicted without chute walls for clarity. Notably, when the main airflow chutes 134 are configured in accordance with the exemplary chutes of FIG. 11, the dome 104 may include a relatively large number of main airflow chutes 134, spaced along the circumferential direction C in order to provide the desired amount of airflow in a desired direction.

As will be appreciated, in certain embodiments, the seal chute 146 may be configured in accordance with any of the above chutes described herein. Similarly, in other exemplary embodiments, the main air chutes 134 of the trapped vortex combustor 100 may also be configured in accordance with one or more of the above chutes described herein. For example, it will be appreciated that in certain exemplary embodiments the main air chutes 134 may not include any airflow members therein and may induce swirl through a curvature/direction of the main air chute sidewalls 136 (see FIG. 2).

Moreover, it should be appreciated that in still other exemplary embodiments, the trapped vortex combustor 100 may have still any other suitable configuration. For example, in other exemplary embodiments, the trapped vortex combustor 100 may not include any seal chutes 146, or alternatively may not include any main air chutes 134 (e.g., when the seal chutes 146 introduce airflow at a swirl angle greater than zero). Additionally, or alternatively, the dome 104 of the trapped vortex combustor 100 may include one or more dilution air holes 147 or chutes having any suitable configuration, cooling air holes 145 having any suitable configuration, fuel nozzle assembly having any suitable configuration, etc.

Figure 12:
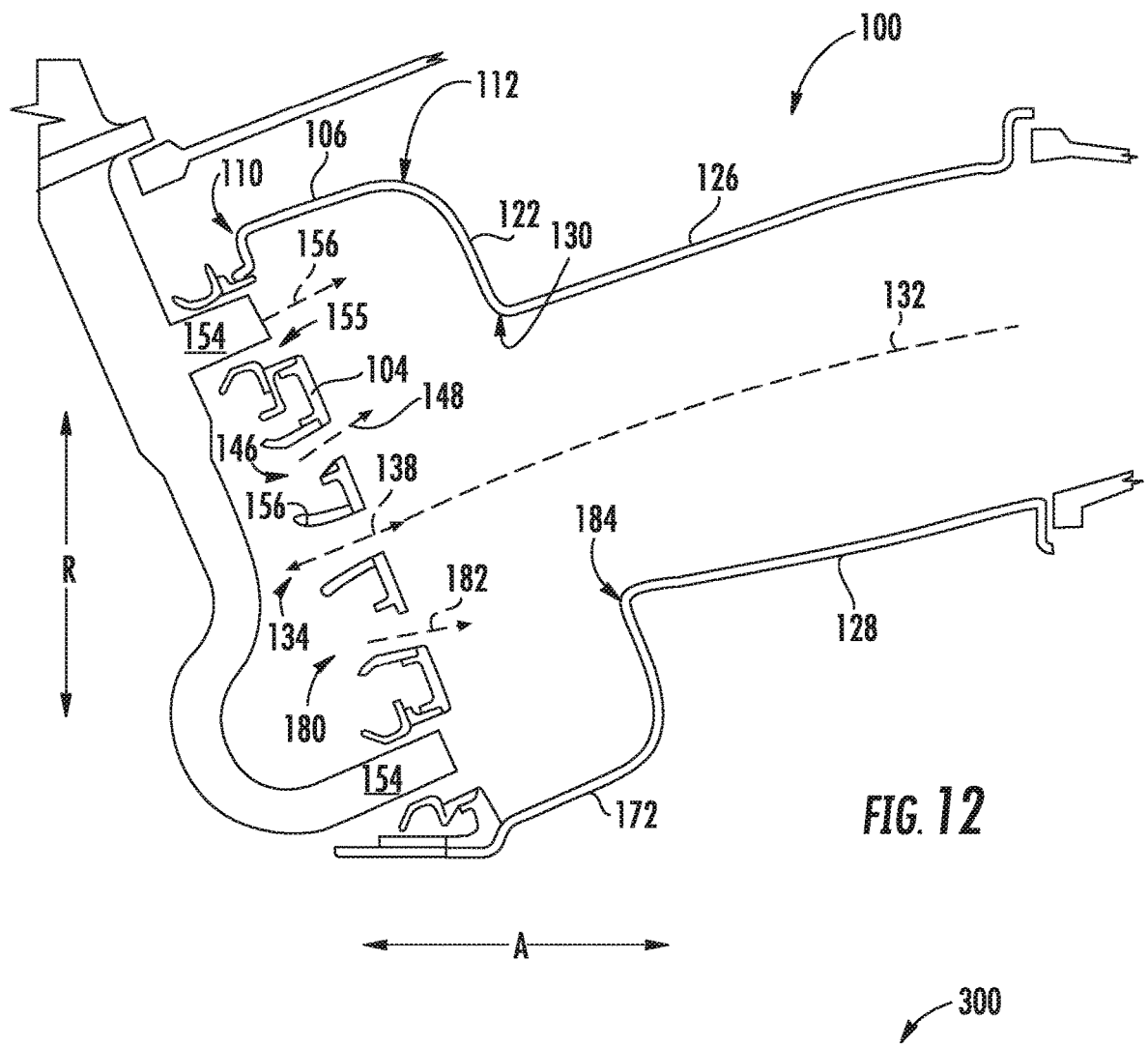
FIG. 12 is a side, schematic, cross-sectional view of a combustor assembly in accordance with another exemplary embodiment of the present disclosure.

Further, referring now to FIG. 12, a side, schematic, cross-sectional view is provided of a trapped vortex combustor 100 in accordance with another exemplary embodiment of the present disclosure. The exemplary trapped vortex combustor 100 of FIG. 12 may be configured in substantially the same manner as the exemplary trapped vortex combustor 100 described above with reference to FIG. 2. Accordingly, the same or similar numbers may refer to same or similar parts.

As is depicted, the trapped vortex combustor 100 generally includes an outer vortex chamber wall 106, an outer transition wall 122, and an outer combustion chamber liner 126. Additionally, the trapped vortex combustor 100 includes, for the embodiment shown, an inner vortex chamber wall 172, an inner transition wall 174, and an inner combustion chamber liner 128. Further, the trapped vortex combustor 100 includes a dome 104 attached to a forward end 110 of the outer vortex chamber wall 106 and further attached to a forward end 176 of the inner vortex chamber wall 172. The outer transition wall 122 is coupled to and extends between the outer vortex chamber wall 106 and the outer combustion chamber liner 126, and the inner transition wall 174 is coupled to and extends between the inner vortex chamber wall 172 and the inner combustion chamber liner 128. Accordingly, for the embodiment depicted, the outer vortex chamber wall 106, the dome 104, the inner vortex chamber wall 172, the outer combustion chamber liner 126, and inner combustion chamber liner 128 together define at least in part the combustion chamber 114.

Notably, however, for the embodiment of FIG. 12, in addition to the outer vortex chamber wall 106 and dome 104 defining an outer trapped vortex chamber 118 of the combustion chamber 114, the inner vortex chamber wall 172 and dome 104 define an inner trapped vortex chamber 178 of the combustion chamber 114. With such an exemplary embodiment, the dome 104 further includes an outer seal chute 146 defining an airflow direction 148 intersecting a corner 130 formed by the outer transition wall 122 and the outer combustion chamber liner 126, as well as an inner seal chute 180 defining an airflow direction 182 intersecting a corner 184 formed by the inner transition wall 174 and the inner combustion chamber liner 128. Further, the exemplary trapped vortex combustor 100 of FIG. 12 includes a main air chute 134, the main air chute 134 defining an airflow direction 138 having a swirl angle 142. More specifically, the airflow direction 138 of the main air chute 134 defines an angle greater than zero (0) with a reference plane 144 defined by a radial direction R and an axial direction A of the trapped vortex combustor 100 depicted (see, e.g., FIG. 3). The main air chute 134 for the embodiment shown is positioned inwardly (along the radial direction R) of the outer trapped vortex chamber 118 and outwardly (along the radial direction R) of the inner trapped vortex chamber 178.

Figure 13:
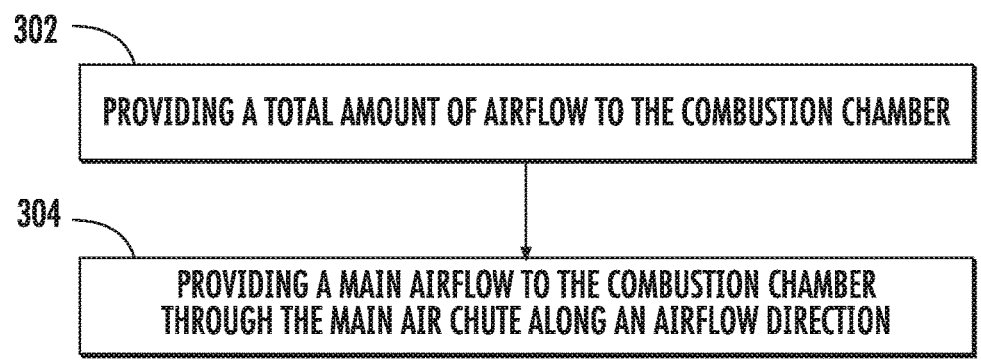
FIG. 13 is a flow diagram of a method for operating a combustor assembly in accordance with an exemplary aspect of the present disclosure.

Referring now to FIG. 13, a flow diagram of a method 300 for operating a trapped vortex combustor of a gas turbine engine is provided. The trapped vortex combustor may be configured in the same or similar manner as one or more of the exemplary trapped vortex combustors described above with reference to FIGS. 1 through 12. Accordingly, for example, the trapped vortex combustor may include an outer vortex chamber wall and a dome attached to, or formed integrally with, the outer vortex chamber wall. The dome and the outer vortex chamber wall define at least in part a combustion chamber having an outer trapped vortex chamber. Additionally, the dome includes a main air chute.

A method 300 generally includes at (302) providing a total amount of airflow to the combustion chamber. The total amount of airflow provided at (302) may be provided through various sources, including, e.g., cooling air holes, dilution air holes, seal chutes, etc. For example, for the exemplary aspect depicted, providing the total amount of airflow to the combustion chamber at (302) includes providing an airflow to the combustion chamber through an air chute along an airflow direction. More specifically, for the aspect depicted, providing the total amount of airflow to the combustion chamber at (302) includes at (304) providing a main airflow to the combustion chamber through the main air chute along an airflow direction. The airflow direction defines an angle with a reference plane greater than zero degrees and less than about forty-five degrees. The reference plane is defined by a radial direction and an axial direction of the gas turbine engine including the trapped vortex combustor.

Moreover, for the exemplary aspect depicted, the dome further includes a plurality of main air chute spaced along a circumferential direction of the gas turbine engine including the trapped vortex combustor. Notably, the axial, radial, and circumferential directions of the gas turbine engine may align with an axial direction, a radial direction, and a circumferential direction of the trapped vortex combustor. With such an exemplary aspect, providing the main airflow to the combustion chamber through the main air chute at (304) may further include at (306) providing the main airflow to the combustion chamber through the plurality of main air chutes spaced along the circumferential direction. With such an exemplary aspect, the main airflow may be at least about fifteen percent of the total amount of airflow provided to the combustion chamber at (302). For example, at least certain exemplary aspects, the main airflow may be between about twenty percent and about eighty-five percent of the total amount of airflow provided to the combustion chamber at (302).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A trapped vortex combustor for use in a gas turbine engine, the trapped vortex combustor defining a radial direction, an axial direction, and a circumferential direction, the trapped vortex combustor comprising:
    an outer vortex chamber wall defining a forward end; and
    a dome attached to, or formed integrally with, the outer vortex chamber wall at the forward end of the outer vortex chamber wall, the dome and outer vortex chamber wall defining at least in part a combustion chamber having an outer trapped vortex chamber, the dome comprising an air chute located inwardly of the outer vortex chamber along the radial direction and defining an airflow direction, the radial direction and axial direction of the trapped vortex combustor defining a reference plane extending through the air chute, the airflow direction of the air chute defining an angle greater than zero with the reference plane;
    wherein the air chute defines a height generally along the radial direction and a width generally along the circumferential direction, wherein the height is greater than the width.

2. The trapped vortex combustor of claim 1, wherein the angle defined by the airflow direction of the air chute with the reference plane is greater than five degrees and less than fifty degrees.

3. The trapped vortex combustor of claim 1, wherein the air chute is a main air chute of the dome.

4. The trapped vortex combustor of claim 3, wherein the dome further comprises a plurality of main air chutes spaced along the circumferential direction of the trapped vortex combustor, wherein the combustion chamber is configured to receive a total amount of airflow during operation, and wherein at least fifteen percent of the total amount of airflow is provided through the plurality of main air chutes.

5. The trapped vortex combustor of claim 4, wherein between twenty percent and eighty-five percent of the total amount of airflow is provided through the plurality of main air chutes.

6. The trapped vortex combustor of claim 1, wherein the air chute is a main air chute of the dome, wherein the dome further comprises a seal chute, wherein the seal chute defines a second airflow direction in the reference plane, wherein the dome defines a reference line extending through the seal chute in the reference plane, and wherein the second airflow direction defines an angle with the reference line of the dome less than ninety degrees and greater than forty-five degrees.

7. The trapped vortex combustor of claim 6, further comprising: an outer transition wall attached to or formed integrally with the outer vortex chamber wall; and an outer combustion chamber liner attached to or formed integrally with the outer transition wall, wherein the outer transition wall and the outer combustion chamber liner together form a corner, and wherein the second airflow direction of the seal chute intersects the corner.

8. The trapped vortex combustor of claim 1, further comprising:
    an outer transition wall attached to or formed integrally with the outer vortex chamber wall, wherein at least one of the dome, the outer vortex chamber wall, or the outer transition wall defines a fuel nozzle opening; and
    a fuel nozzle positioned in or extending through the fuel nozzle opening, the fuel nozzle defining a mean fuel spray direction, and wherein the mean fuel spray direction defines an angle with the reference plane greater than zero degrees and less than forty-five degrees.

9. The trapped vortex combustor of claim 8, wherein the angle defined by the mean fuel spray direction and the reference plane is greater than ten degrees and less than forty degrees.

10. The trapped vortex combustor of claim 1, further comprising:
    an inner vortex chamber wall comprising a forward end and defining in part the combustion chamber, wherein the dome is attached to or formed integrally with the inner vortex chamber wall at the forward end of the inner vortex chamber wall, and wherein the combustion chamber further comprises an inner vortex chamber.

11. The trapped vortex combustor of claim 1, wherein the air chute is a main air chute, and wherein the main air chute is positioned outward of the inner vortex chamber along the radial direction.

12. The trapped vortex combustor of claim 1, wherein the air chute is a main air chute of the dome, wherein the angle defined by the airflow direction of the main air chute with the reference plane is a first angle, wherein the dome further comprises a seal chute, wherein the seal chute air chute defines a second airflow direction, wherein the second airflow direction of the air chute defines a second angle with the reference plane, and wherein the first angle is not equal to the second angle.

13. The trapped vortex combustor of claim 12, wherein the main air chute is positioned inward of the seal chute along the radial direction.

14. A trapped vortex combustor for use in a gas turbine engine, the trapped vortex combustor defining a radial direction, an axial direction, and a circumferential direction, the trapped vortex combustor comprising:
an outer vortex chamber wall defining a forward end; and
a dome attahed to, or formed integrally with, the outer vortex chamber wall at the forward end of the outer vortex chamber wall, the dome and outer vortex chamber wall defining at least in part a combustion chamber having an outer trapped vortex chamber, the dome comprising an air chute defining an airflow direction, the radial direction and axial direction of the trapped vortex combustor defining a reference plane extending through the air chute, the airflow direction of the air chute defining an angle greater than zero with the reference plane;
wherein the air chute is a main air chute of the dome, wherein the dome further comprises a seal chute, wherein the seal chute defines a second airflow direction in the reference plane, wherein the dome defines a reference line extending through the seal chute in the reference plane, and wherein the second airflow direction defines an angle with the reference line of the dome less than ninety degrees and greater than forty-five degrees.

15. The trapped vortex combustor of claim 14, further comprising:
an outer transition wall attached to or formed integrally with the outer vortex chamber wall; and an outer combustion chamber liner attached to or formed internally with the outer transition wall, wherein the outer transition wall and the outer combustion chamber liner together form a corner, and wherein the second airflow direction of the seal chute intersects the corner.

16. The trapped vortex combustor of claim 14, wherein the air chute defines a height generally along the radial direction and a width generally along the circumferential direction, and wherein the height is greater than the width.

17. A method for operating a trapped vortex combustor of a gas turbine engine, the trapped vortex combustor comprising an outer vortex chamber wall and a dome attached to, or formed integrally with, the outer vortex chamber wall, the dome and the outer vortex chamber wall defining at least in part a combustion chamber having an outer trapped vortex chamber, the dome further comprising a main air chute, the method comprising:
providing a total amount of airflow to the combustion chamber, wherein providing the total amount of airflow to the combustion chamber comprises providing a main airflow to the combustion chamber through the main air chute along an airflow direction, the airflow direction defining an angle with a reference plane greater than zero degrees and less than forty-five degrees, the reference plane defined by a radial direction and an axial direction of the gas turbine engines;
wherein the dome further comprises a seal chute, wherein the trapped vortex combustor further comprises an outer transition wall attached to or formed integrally with the outer vortex chamber wall, and an outer combustion chamber liner attached to or formed integrally with the outer transition wall, wherein the outer transition wall and the outer combustion chamber liner together form a corner, and
directing air through the seal chute to intersect the corner.

18. The method of claim 17, wherein the dome further comprises a plurality of main air chutes spaced along a circumferential direction of the gas turbine engine, and wherein providing the main airflow to the combustion chamber through the main air chute comprises providing the main airflow to the combustion chamber through the plurality of main air chutes spaced along the circumferential direction, and wherein the main airflow is at least fifteen percent of the total amount of airflow provided to the combustion chamber.

* * * * *